(12) United States Patent
Tarumi et al.

(10) Patent No.: US 12,548,983 B2
(45) Date of Patent: Feb. 10, 2026

(54) OPTICAL SEMICONDUCTOR DEVICE AND SEMICONDUCTOR LASER DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP); QD LASER, Inc., Kawasaki (JP)

(72) Inventors: Hiroyuki Tarumi, Nisshin (JP); Yuki Kamata, Nisshin (JP); Keizo Takemasa, Kawasaki (JP); Kenichi Nishi, Kawasaki (JP); Yutaka Ohnishi, Kawasaki (JP)

(73) Assignees: DENSO CORPORATION, Kariya (JP); TOYOTA JIDOSHA KABUSHIKI KAISHA, Toyota (JP); MIRISE Technologies Corporation, Nisshin (JP); QD LASER, Inc., Kawasaki (JP)

( * ) Notice: Subject to any disclaimer, the term of this patent is extended or adjusted under 35 U.S.C. 154(b) by 694 days.

(21) Appl. No.: 17/724,570

(22) Filed: Apr. 20, 2022

(65) Prior Publication Data

US 2022/0344906 A1 Oct. 27, 2022

(30) Foreign Application Priority Data

Apr. 21, 2021 (JP) .................................. 2021-071809

(51) Int. Cl.
*H01S 5/34* (2006.01)
*H01S 5/065* (2006.01)
*H01S 5/30* (2006.01)
*H01S 5/343* (2006.01)

(52) U.S. Cl.
CPC .......... *H01S 5/3412* (2013.01); *H01S 5/0654* (2013.01); *H01S 5/3054* (2013.01); *H01S 5/3086* (2013.01); *H01S 5/34313* (2013.01)

(58) Field of Classification Search
CPC ................... H01S 5/341; H01S 5/3412; H01S 5/305–3063; H01S 5/3086–309
See application file for complete search history.

(56) References Cited

U.S. PATENT DOCUMENTS

| | | | |
|---|---|---|---|
| 5,033,053 A * | 7/1991 | Shimizu | H01S 5/06255 372/50.121 |
| 2004/0131097 A1* | 7/2004 | Deppe | B82Y 20/00 372/45.01 |
| 2004/0169173 A1* | 9/2004 | Saito | B82Y 20/00 257/14 |
| 2005/0169332 A1* | 8/2005 | Schwarz | H01S 5/341 372/39 |

(Continued)

FOREIGN PATENT DOCUMENTS

| | | |
|---|---|---|
| JP | 2011-003803 A | 1/2011 |
| JP | 2014-045015 A | 3/2014 |

*Primary Examiner* — Sean P Hagan
(74) *Attorney, Agent, or Firm* — Posz Law Group, PLC

(57) ABSTRACT

An optical semiconductor device includes an active layer having a plurality of quantum dot layers. The plurality of quantum dot layers includes at least one quantum dot player doped with a p-type impurity. Further, the plurality of quantum dot layers includes at least two quantum dot layers having different emission wavelengths and different p-type impurity concentrations.

20 Claims, 11 Drawing Sheets

(56) References Cited

U.S. PATENT DOCUMENTS

| | | | |
|---|---|---|---|
| 2008/0165819 A1* | 7/2008 | Lin | B82Y 20/00 |
| | | | 372/44.01 |
| 2008/0308788 A1* | 12/2008 | Ebe | H01S 5/341 |
| | | | 257/18 |
| 2009/0236584 A1* | 9/2009 | Makihara | H01L 33/08 |
| | | | 438/47 |
| 2023/0027143 A1* | 1/2023 | Kamata | H01S 5/3412 |

* cited by examiner

OPTICAL SEMICONDUCTOR DEVICE AND SEMICONDUCTOR LASER DEVICE

CROSS REFERENCE TO RELATED APPLICATION

The present application claims the benefit of priority from Japanese Patent Application No. 2021-071809 filed on Apr. 21, 2021, and the entire disclosures of which are incorporated herein by reference.

TECHNICAL FIELD

The present disclosure relates to an optical semiconductor device having a quantum dot layer, and a semiconductor laser device.

BACKGROUND

In a semiconductor laser device using an optical semiconductor element such as a semiconductor optical amplifier (SOA), it has been proposed to contain an electron three-dimensionally with a quantum dot layer and to add a p-type impurity in a vicinity of an active layer so as to achieve a high output in a wide temperature range while suppressing a decrease in output at a high temperature.

In an optical semiconductor device using a quantum dot layer, the output is less likely to decrease at a high temperature than that in a device using a quantum well, but a wavelength band is likely to be narrow. Thus, it has been also proposed to combine a plurality of quantum dot layers having different emission wavelengths so as to achieve a large output in a wide wavelength band.

SUMMARY

The present disclosure describes an optical semiconductor device and a semiconductor laser device having the optical semiconductor device, which are capable of reducing output fluctuations due to a temperature change. The optical semiconductor device may include an active layer having a plurality of quantum dot layers. The plurality of quantum dot layers may include at least one quantum dot layer doped with a p-type impurity. The plurality of quantum dot layers may include at least two quantum dot layers having different emission wavelengths and different p-type impurity concentrations.

BRIEF DESCRIPTION OF THE DRAWINGS

Objects, features and advantages of the present disclosure will become more apparent from the following detailed description made with reference to the accompanying drawings, in which like parts are designated by like reference numbers and in which.

DETAILED DESCRIPTION

Figure 1:
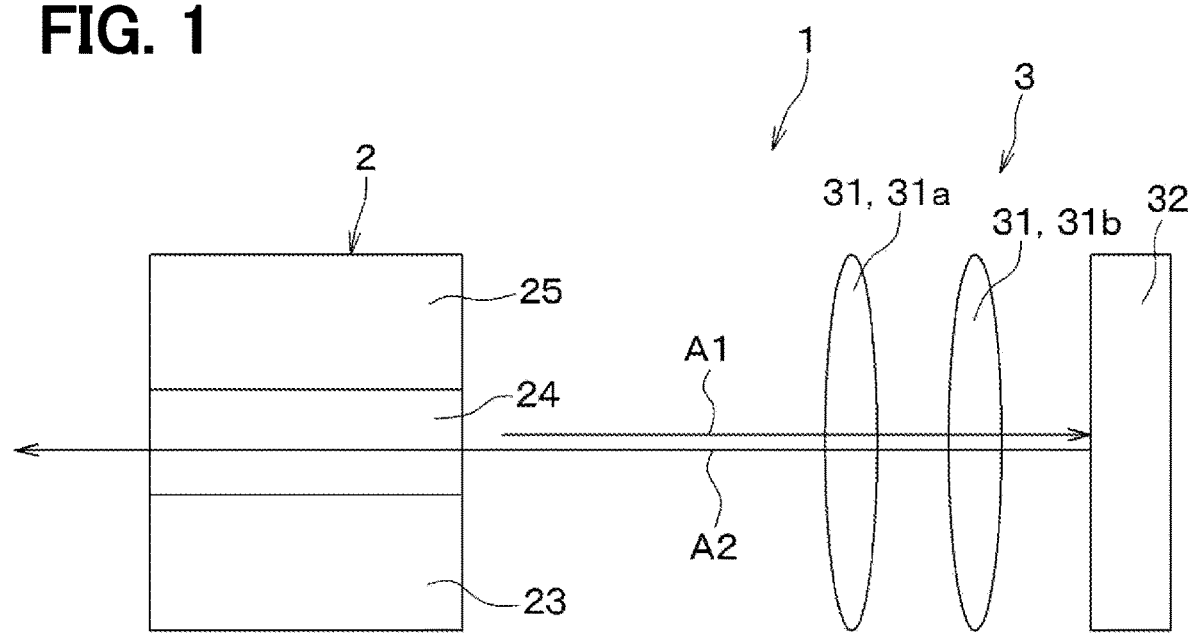
FIG. 1 is a diagram showing a schematic configuration of a semiconductor laser device according to a first embodiment.

In an optical semiconductor device using a quantum dot layer doped with a p-type impurity, the gain of the quantum dot layer is likely to decrease at a low temperature. Therefore, if only the quantum dot layer doped with a p-type impurity is used, the output may be insufficient at a low temperature.

On the other hand, it is conceivable to use a quantum dot layer that is not doped with a p-type impurity. In such a quantum dot layer, the decrease in gain at a low temperature is smaller than that of the quantum dot layer doped with the p-type impurity, but the decrease in gain at a high temperature is larger than that of the quantum dot layer doped with the p-type impurity. Therefore, if only the quantum dot layer that is not doped with the p-type impurity is used, the output may be insufficient at a high temperature.

The present disclosure provides an optical semiconductor device and a semiconductor laser device capable of reducing output fluctuations due to a temperature change.

According to an aspect of the present disclosure, an optical semiconductor device includes an active layer having a plurality of quantum dot layers. The plurality of quantum dot layers include at least one quantum dot layer doped with a p-type impurity. The plurality of quantum dot layers include at least two quantum dot layers having different emission wavelengths and different p-type impurity concentrations.

In such a configuration, since the active layer includes the at least two quantum dot layers having different p-type impurity concentrations, the gain of the active layer has characteristics of the quantum dot layer having a higher p-type impurity concentration and characteristics of the quantum dot layer having a lower p-type impurity concentration. Therefore, it is possible to reduce the fluctuations of the output due to the temperature change.

DETAILED DESCRIPTION

Hereinafter, embodiments of the present disclosure will be described with reference to the drawings. In the following embodiments, the same or equivalent parts are designated with the same reference numerals.

First Embodiment

A first embodiment will be described. As shown in FIG. 1, a semiconductor laser device 1 of the present embodiment includes a semiconductor optical amplifier (SOA) 2 as an optical semiconductor device, and a wavelength selector 3. The semiconductor laser device 1 is applied to, for example, a laser radar, LiDAR, or the like. LiDAR is an abbreviation for Light Detection And Ranging. The SOA 2 and the wavelength selector 3 are formed, for example, by processing a semiconductor substrate (not shown) through a semiconductor process.

Figure 2:
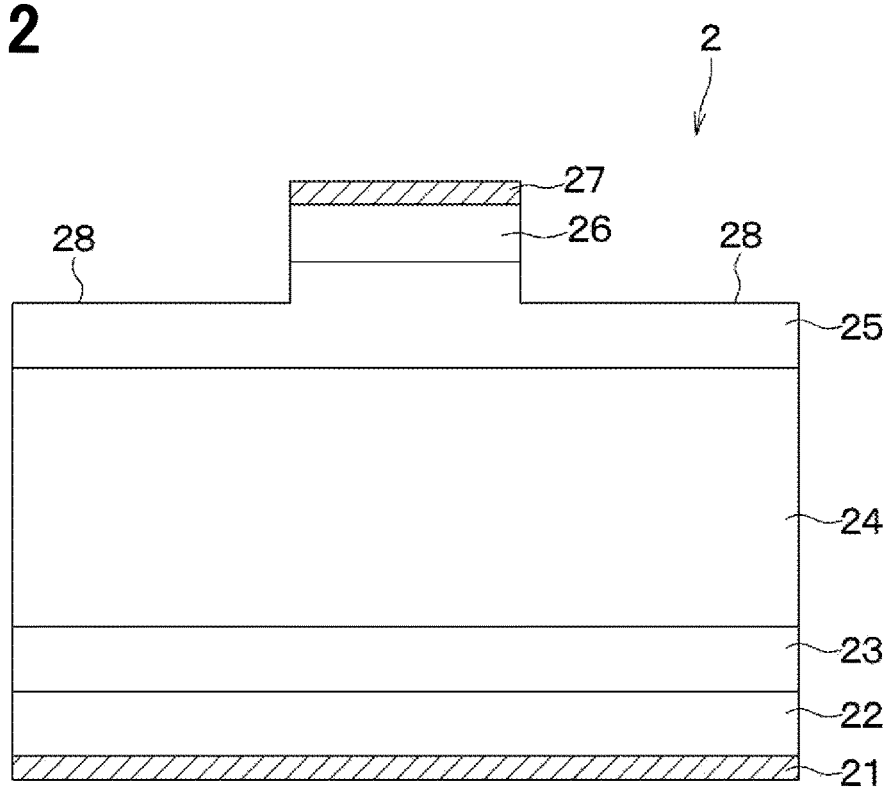
FIG. 2 is a cross-sectional view of a SOA of the semiconductor laser device shown in FIG. 1.

The SOA 2 is a light source that generates a laser light. As shown in FIG. 2, the SOA 2 includes a stacked structure of a lower electrode 21, a substrate 22, an underclad layer 23, an active layer 24, an overclad layer 25, a contact layer 26, and an upper electrode 27. Note that FIG. 1 shows only the underclad layer 23, the active layer 24, and the overclad layer 25 of the SOA 2.

As shown in FIG. 2, the lower electrode 21 is in contact with a back surface of the substrate 22, which is opposite to the underclad layer 23. The substrate 22 is made of, for example, a GaAs substrate. The underclad layer 23 is made of n-type AlGaAs or the like. The active layer 24 is formed on an upper surface of the underclad layer 23. Details of the active layer 24 will be described later.

The overclad layer 25 is formed on an upper surface of the active layer 24 and is made of p-type AlGaAs or the like. The contact layer 26 is provided for making contact with the upper electrode 27, and is formed on an upper surface of the overclad layer 25. The contact layer 26 is made of, for example, GaAs.

The upper electrode 27 is formed on an upper surface of the contact layer 26. A recess 28 is formed to penetrate the upper electrode 27 and the contact layer 26, and to reach the surface layer of the overclad layer 25. Thus, the SOA 2 has a mesa structure in which the upper electrode 27 and the contact layer 26 protrude at a position other than the recess 28.

In the SOA 2 configured as described above, when a voltage is applied to cause a predetermined potential difference between the upper electrode 27 and the lower electrode 21, laser oscillation is generated and laser light is emitted from the end face of the active layer 24.

Figure 3:
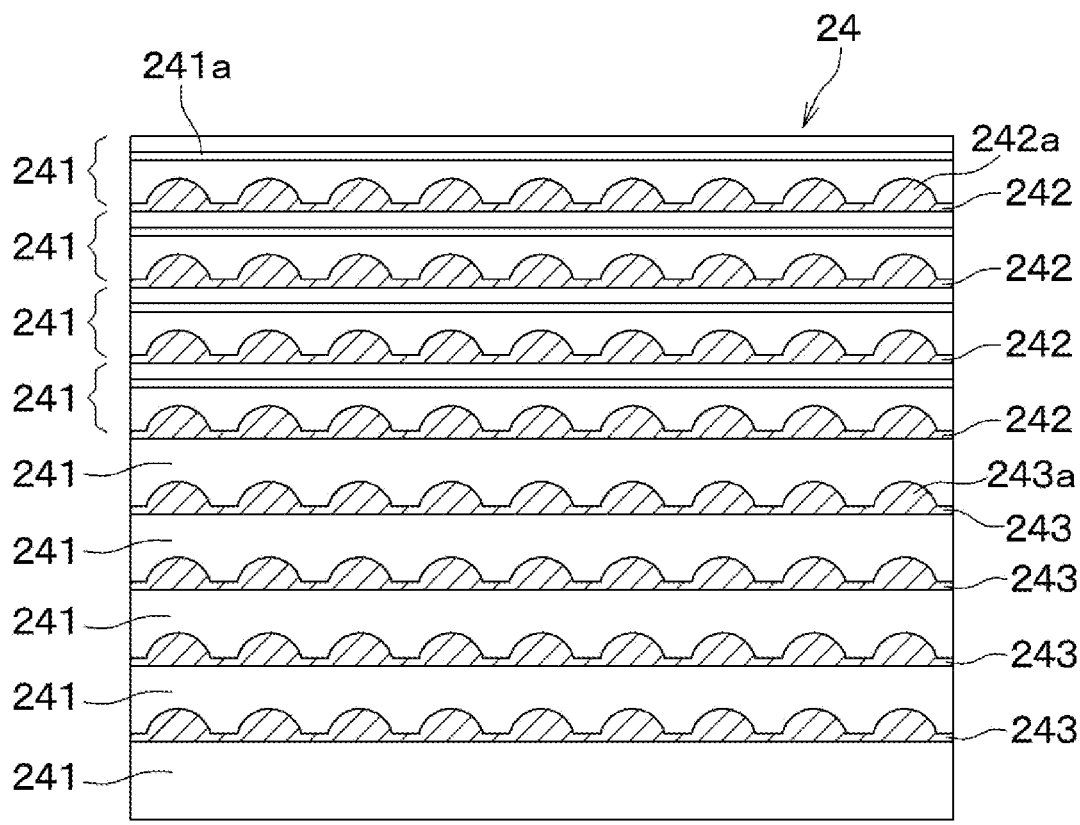
FIG. 3 is a cross-sectional view of an active layer of the SOA shown in FIG. 2.

The detailed configuration of the active layer 24 will be described. As shown in FIG. 3, the active layer 24 includes intermediate layers 241. The intermediate layer 241 is made of GaAs. The active layer 24 further includes a plurality of quantum dot layers. The quantum dot layers are made of, for example, InAs or InGaAs. The quantum dot layer has a structure including granular quantum dots formed by crystal growth, microfabrication, or the like, and the front surface and the back surface of the quantum dot layer are covered with the intermediate layers 241.

A gain spectrum of the active layer 24 has a maximum value composed of light emission by the base level of the plurality of quantum dot layers. The emission wavelength and the gain intensity of the active layer 24 are determined by the composition of the plurality of quantum dot layers. The gain spectrum can be measured, for example, by the Hakki-Paoli method.

Among the plurality of quantum dot layers, at least a part of the quantum dot layers is doped with a p-type impurity. Further, among the plurality of quantum dot layers, at least two quantum dot layers have different emission wavelengths and different p-type impurity concentrations. Among the emission wavelengths of the plurality of quantum dot layers, the shortest emission wavelength is defined as $\lambda p$, and the longest emission wavelength is defined as $\lambda u$.

The active layer 24 of the present embodiment includes two types of quantum dot layers. The two types of quantum dot layers are referred to as a quantum dot layer 242 and a quantum dot layer 243. The quantum dot layer 242 is a doped quantum dot layer doped with a p-type impurity, and the quantum dot layer 243 is an undoped quantum dot layer containing almost no p-type impurity.

The p-type impurity concentration is set based on, for example, the number of holes contained in one quantum dot. Specifically, at most two holes can be contained in one quantum dot. The p-type impurity concentration of the quantum dot layer, which has the highest p-type impurity concentration among the plurality of quantum dot layers, is at least twice the surface density of the quantum dots. Further, the p-type impurity concentration of the quantum dot layer, which has the lowest p-type impurity concentration among the plurality of quantum dot layers, is less than twice the surface density of the quantum dots. In the present embodiment, the p-type impurity concentration of the quantum dot layer 242 is at least twice the surface density of the quantum dots 242a, and the p-type impurity concentration of the quantum dot layer 243 is less than twice the surface density of the quantum dots 243a.

The active layer 24 includes four quantum dot layers 242 and four quantum dot layers 243. The four quantum dot layers 242 have the same p-type impurity concentration. Also, the four quantum dot layers 243 have the same p-type impurity concentration. The four quantum dot layers 242 are stacked on top of the four quantum dot layers 243. As described above, the intermediate layers 241 are stacked on both sides of each of the quantum dot layers 242 and 243. The intermediate layer 241 formed between the two quantum dot layers 242 and the intermediate layer 241 formed on the uppermost quantum dot layer 242 include a p-type impurity layer 241a.

Figure 4:
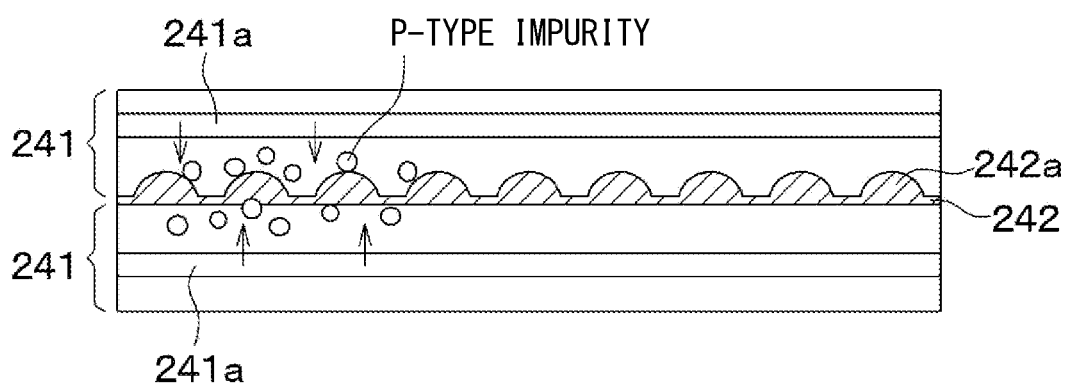
FIG. 4 is a diagram for explaining diffusion of p-type impurities.

The p-type impurity layer 241a is a layer formed by adding a p-type impurity during the formation of the intermediate layer 241 and is configured to contain a small amount of p-type impurity in GaAs. This p-type impurity is made of any of beryllium, carbon, and magnesium. By arranging the p-type impurity layer 241a in the vicinity of the quantum dot layer 242 in this way, the p-type impurities diffused from the p-type impurity layer 241a are added to the quantum dot layer 242, as shown by arrows in FIG. 4.

As described above, the quantum dot layer 242 and the quantum dot layer 243 have different emission wavelengths from each other. Specifically, the emission wavelength of the quantum dot layer 242 is shorter than the emission wavelength of the quantum dot layer 243. In the present embodiment, the wavelength λp corresponds to the emission wavelength of the quantum dot layer 242, that is, the wavelength of the quantum dot layer 242 at which the gain of the quantum dot layer 242 peaks, and the wavelength λu corresponds to the emission wavelength of the quantum dot layer 243.

Figure 5:
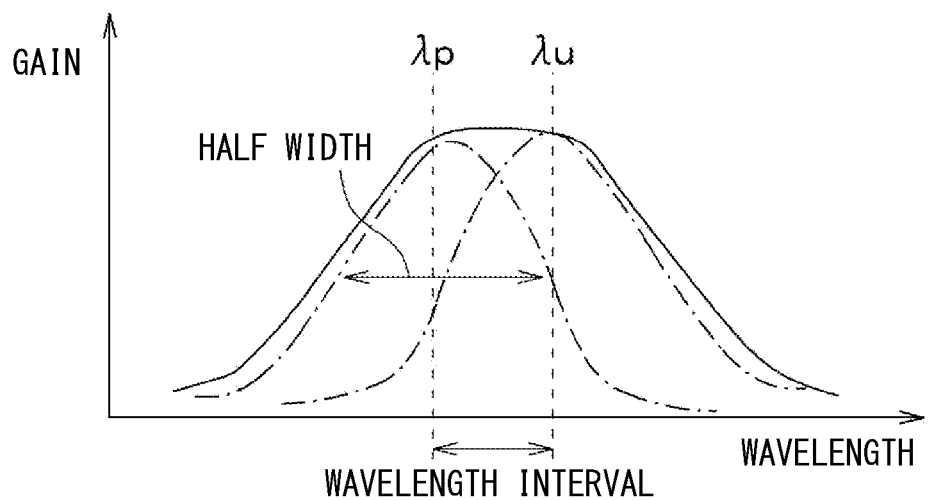
FIG. 5 is a diagram showing a gain spectrum of the active layer.

With such a configuration, the active layer 24 has a gain spectrum as shown in FIG. 5. In FIG. 5, a solid line shows the gain spectrum of the active layer 24. Further, an alternate long and short dash line on the left side shows the gain spectrum of the quantum dot layer 242, and an alternate long and short dash line on the right side shows the gain spectrum of the quantum dot layer 243. In this way, by combining the two gain spectra, a wide band spectrum having a large gain at wavelengths between the wavelength λp and the wavelength λu is formed.

If the wavelength λp and the wavelength λu are apart, the gain spectrum of the active layer 24 has a wide band. However, if the wavelength λp and the wavelength λu are excessively apart from each other, the gain drops at a wavelength between the wavelength λp and the wavelength λu. Therefore, the interval between the wavelength λp and the wavelength λu is made small to some extent.

Specifically, the interval between the wavelength λp and the wavelength λu is set to be equal to or less than a distance obtained by multiplying a variation width of an environmental temperature by the temperature coefficient of the quantum dot layers 242 and 243. The variation width of the environmental temperature is the width or range of the temperature changes assumed in an environment in which the semiconductor laser device 1 is used.

The temperature coefficient is obtained as follows. The wavelength of the gain spectrum of the quantum dot layer shifts due to the temperature change. The wavelength at which the quantum dot layer 242 has a peak gain under an environmental temperature T1 is referred to as λ1. The wavelength at which the quantum dot layer 242 has a peak gain under an environmental temperature T2 is referred to as λ2. The temperature coefficient is expressed as (λ2−λ1)/(T2−T1). The wavelength λ1 and the wavelength λ2 are obtained by measurement.

In the quantum dot layers 242 and 243, the shift amount of the emission wavelength due to the temperature change is substantially the same. Therefore, the temperature coefficients of the quantum dot layers 242 and 243 are substantially the same. As such, the temperature coefficient of either the quantum dot layer 242 or the quantum dot layer 243 may be used for setting the interval of the wavelengths.

Further, as shown in FIG. 5, the interval between the wavelength λp and the wavelength λu is set to be equal to or less than the half width of the gain spectra of the quantum dot layers 242 and 243.

The wavelength selector 3 is a device to select an operating wavelength of the semiconductor laser device 1, specifically, the operating wavelength of the active layer 24. As shown in FIG. 1, the wavelength selector 3 includes an etalon filter 31 and a mirror 32. The operating wavelength of the active layer 24 is defined as λop. The etalon filter 31 transmits only a predetermined wavelength. The etalon filter 31 is arranged so that the light emitted from the active layer 24 is incident on the etalon filter 31. As shown by an arrow A1 in FIG. 1, the light transmitted through the etalon filter 31 is incident on the mirror 32.

The mirror 32 is arranged so as to reflect the light transmitted from the etalon filter 31 toward the etalon filter 31. As shown by an arrow A2 in FIG. 1, the light reflected by the mirror 32 passes through the etalon filter 31 and enters the active layer 24, and is emitted from the end face of the active layer 24 opposite to the etalon filter 31 and the mirror 32. The wavelength of the light transmitting through the etalon filter 31 can be adjusted by the design of the etalon filter 31. Thus, the operating wavelength of the semiconductor laser device 1 can be selected by adjusting the wavelength of the transmitting light.

In the present embodiment, the wavelength selector 3 selects the operating wavelength λop so that the active layer 24 oscillates in a single mode, that is, oscillates at a single wavelength. Specifically, the wavelength selector 3 includes two etalon filters 31. The two etalon filters 31 are referred to as etalon filters 31a and 31b.

The etalon filters 31a and 31b have different free spectrum intervals, and a plurality of wavelengths transmitted by the etalon filter 31a and a plurality of wavelengths transmitted by the etalon filter 31b overlap at only one wavelength. Therefore, as shown in FIG. 1, by placing the etalon filters 31a and 31b on the path of the light emitted from the active layer 24, the light of this one wavelength is incident on the mirror 32 and returns to the active layer 24. As a result, the active layer 24 oscillates in the single mode.

The operating wavelength λop may be selected so that the active layer 24 oscillates in a multimode. However, the gain fluctuation can be reduced by oscillating the active layer 24 in the single mode.

In the example described above, the wavelength selector 3 includes the etalon filter 31 and the mirror 32. As another example, the wavelength selector 3 may include a diffraction grating or the like that reflects only light of a predetermined wavelength. When the wavelength selector 3 includes the diffraction grating, the active layer 24 oscillates in a single mode. Further, the operating wavelength of the semiconductor laser device 1 may be selected by applying a voltage or the like from the outside to the wavelength selector 3 including the etalon filter, the diffraction grating or the like. Further, the reflectance of the mirror 32 may be adjusted so as to emit the light from the mirror 32 side.

The operating wavelength λop is a wavelength between the wavelength λp at a predetermined temperature and the wavelength λu at the predetermined temperature. The predetermined temperature is a room temperature or a temperature at the center of assumed environmental temperatures. The room temperature is a temperature of 20 degrees Celsius (° C.) or higher and 28° C. or lower. The room temperature is, for example, 25° C. The assumed environmental temperatures are, for example, −40° C. or higher and 85° C. or lower.

The temperature characteristics of the gain of the quantum dot layer will be described. As described above, the wavelength of the gain spectrum of the quantum dot layer is shifted due to the temperature change. Specifically, when the temperature rises, the gain spectrum shifts to a long wavelength side, and when the temperature drops, the gain spectrum shifts to a short wavelength side. Therefore, if the operating wavelength is fixed, the output of the quantum dot layer decreases due to the temperature change.

On the other hand, by using a plurality of quantum dot layers having different emission wavelengths in combination, the gain spectrum can be widened and the decrease in gain due to the wavelength shift can be suppressed.

Figure 6:
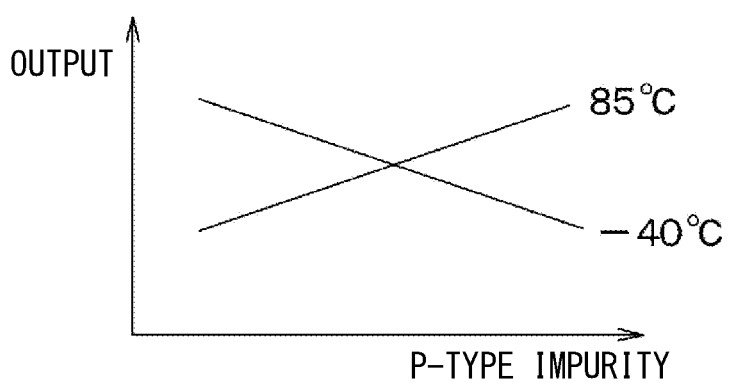
FIG. 6 is a diagram showing a relationship between a p-type impurity concentration and output.

However, the gain of the quantum dot layer also increases or decreases as the temperature changes. The amount of increase or decrease in gain varies depending on the concentration of the p-type impurity. Specifically, as shown in FIG. 6, when the temperature is high, for example, at 85° C., the output increases with an increase in the p-type impurity concentration. On the other hand, when the temperature is low, for example, at −40° C., the output decreases with an increase in the p-type impurity concentration.

Figure 7:
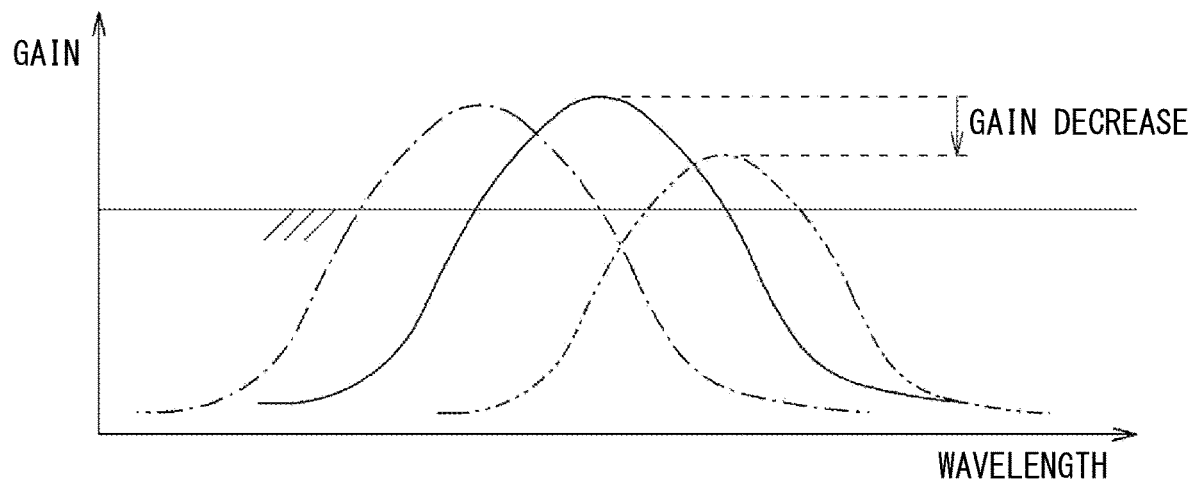
FIG. 7 is a diagram showing a gain spectrum of a quantum dot layer having a low p-type impurity concentration.
Figure 8:
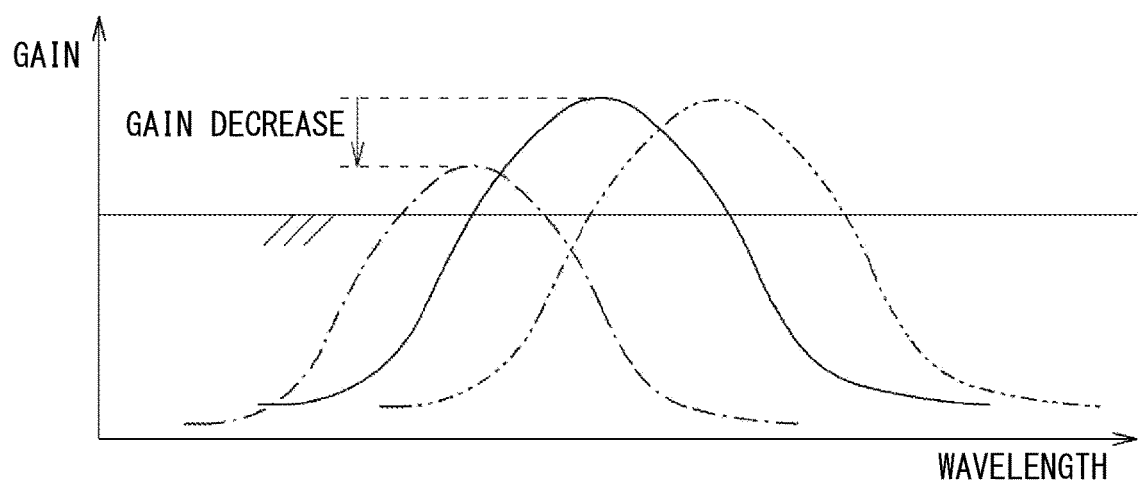
FIG. 8 is a diagram showing a gain spectrum of a quantum dot layer having a high p-type impurity concentration.

FIG. 7 shows gain spectra of the quantum dot layer having a low p-type impurity concentration, and FIG. 8 shows gain spectra of the quantum dot layer having a high p-type impurity concentration. In FIGS. 7 and 8, a solid line shows the gain spectrum at the room temperature, an alternate long and short dash line shows the gain spectrum at the low temperature, and an alternate long and short double dash line shows the gain spectrum at the high temperature. As shown in FIG. 7, in the quantum dot layer having the low p-type impurity concentration, the gain decrease is larger when the temperature is the high temperature than those when the temperature is the room temperature and the low temperature. As shown in FIG. 8, in the quantum dot layer having the high p-type impurity concentration, the gain decrease is larger when the temperature is the low temperature than those when the temperature is the room temperature and the high temperature.

Even when a plurality of quantum dot layers having different emission wavelengths are used in combination, if the plurality of quantum dot layers has the same p-type impurity concentration, the output may decrease due to the above temperature characteristics.

Figure 9:
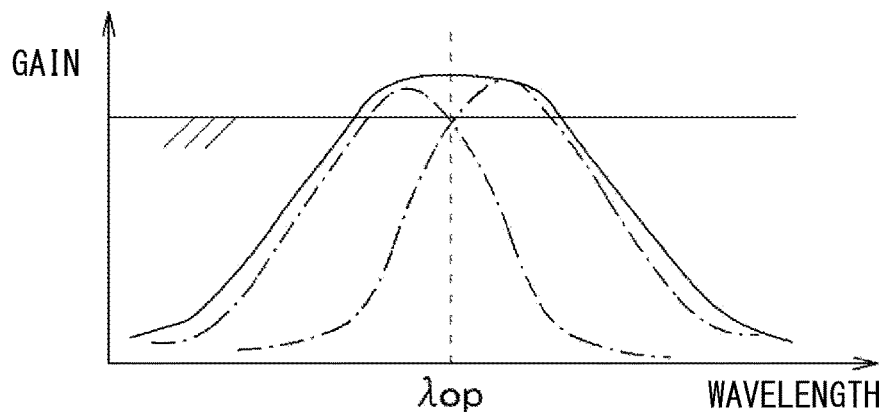
FIG. 9 is a diagram showing a relationship between the gain spectra of the two quantum dot layers and an operating wavelength.

For example, it is assumed that two quantum dot layers both having high p-type impurity concentrations and different emission wavelengths are used, and the operating wavelength λop is fixed at the center of the two peak wavelengths at the room temperature, as shown in FIG. 9. In FIGS. 9 to 13, a solid line shows the gain spectrum of the active layer, an alternate long and short dash line on the left side shows the gain spectrum of one quantum dot layer having a shorter emission wavelength, and an alternate long and short dash line on the right side shows the gain spectrum of the other quantum dot layer having a longer emission wavelength.

Figure 10:
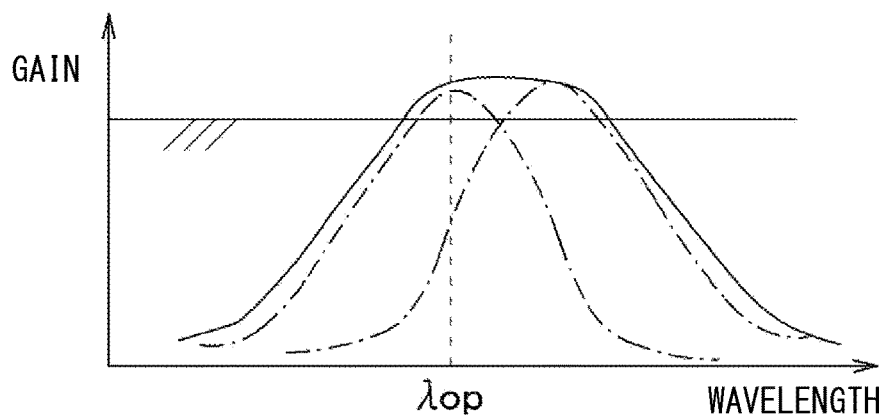
FIG. 10 is a diagram showing a gain spectrum at a high temperature according to a comparative example.

In this case, when the temperature is high, for example, at 85° C., the two gain spectra are shifted to the long wavelength side, as shown in FIG. 10. Since the gain spectrum of the active layer is widened by the combination of the two quantum dot layers, if the temperature change is within a certain range, the operating wavelength λop can be located between the peak wavelength of the gain spectrum of the entire active layer and the peak wavelength of the gain spectrum on the short wavelength side. Further, since the p-type impurity concentration is high, the gain is kept at a high level when the temperature is high. Therefore, the output is maintained by the gain on the short wavelength side.

Figure 11:
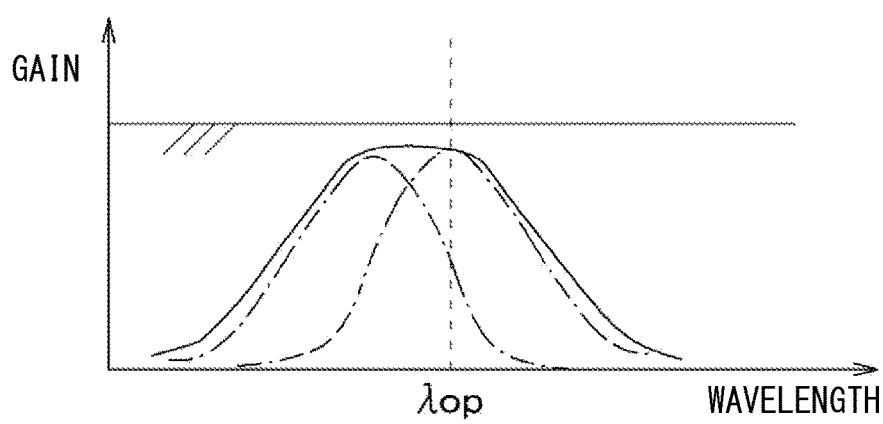
FIG. 11 is a diagram showing a gain spectrum at a low temperature according to the comparative example.

On the other hand, when the temperature is low, for example, at −40° C., as shown in FIG. 11, the two gain spectra shift to the short wavelength side and the gain decreases. Therefore, the output decreases.

Further, it is assumed that two quantum dot layers both having a low p-type impurity concentration are used. In this case, when the temperature is low, if the temperature change is within a certain range, the operating wavelength λop can be located between the peak wavelength of the gain spectrum of the entire active layer and the peak wavelength of the gain spectrum on the long wavelength side. Further, since the p-type impurity concentration is low, the gain is maintained at a high level when the temperature is low. Therefore, the output is maintained by the gain on the long wavelength side. On the other hand, when the temperature is high, the two gain spectra shift to the long wavelength side and the gain decreases, so that the output decreases.

As described above, even if two quantum dot layers having different emission wavelengths are used, when the p-type impurity concentrations of the two quantum dot layers are the same and when the operating wavelength λop is fixed, the output fluctuation is likely to be increased.

On the other hand, in the present embodiment, the quantum dot layer 242 has a shorter emission wavelength and a higher p-type impurity concentration than the quantum dot layer 243.

Figure 12:
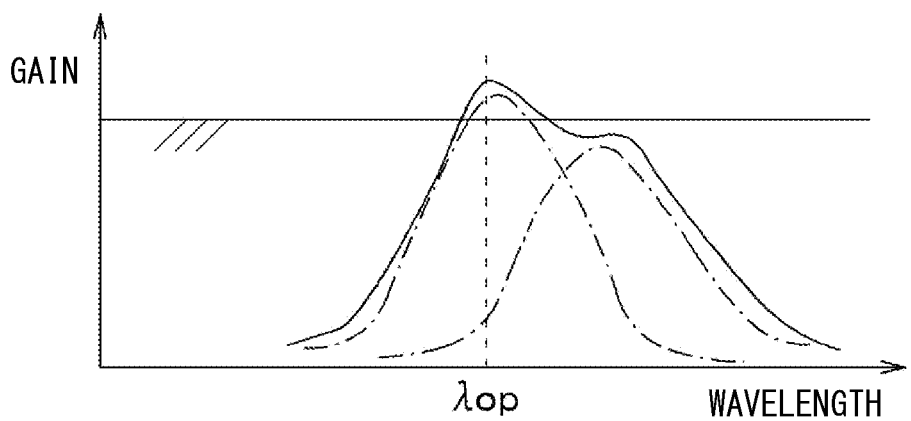
FIG. 12 is a diagram showing a gain spectrum at a high temperature according to the first embodiment.

Therefore, when the temperature is high, for example, at 85° C., as shown in FIG. 12, the two gain spectra shift to the long wavelength side, and the gain of the quantum dot layer 243 having the lower p-type impurity concentration decreases. However, since the gain of the quantum dot layer 242 on the short wavelength side is maintained at a large value, the gain at the operating wavelength λop is maintained and the output is maintained.

Figure 13:
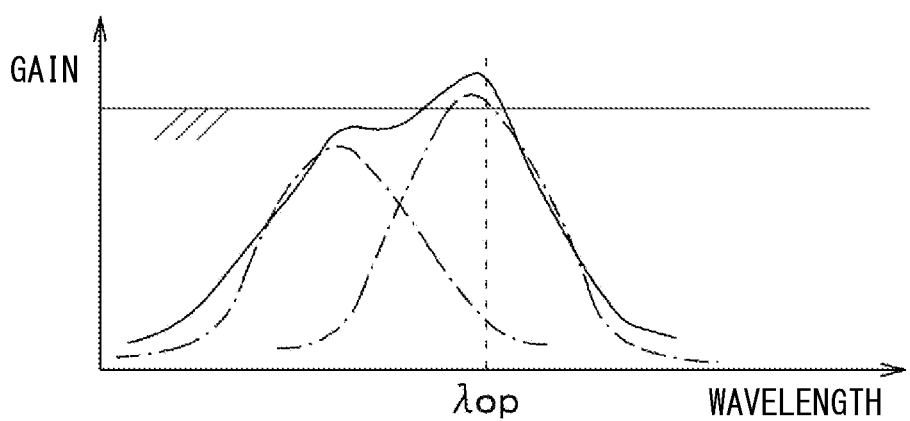
FIG. 13 is a diagram showing a gain spectrum at a low temperature according to the first embodiment.

Further, when the temperature is low, for example, at −40° C., as shown in FIG. 13, the two gain spectra are shifted to the short wavelength side, and the gain of the quantum dot layer 242 having the higher p-type impurity concentration is lowered. However, since the gain of the quantum dot layer 243 on the long wavelength side is maintained at a large value, the gain at the operating wavelength λop is maintained and the output is maintained.

As described above, by using the two-types of the quantum dot layers having different emission wavelengths and different p-type impurity concentrations, the fluctuation of the output is suppressed even when the operating wavelength λop is fixed.

Figure 14:
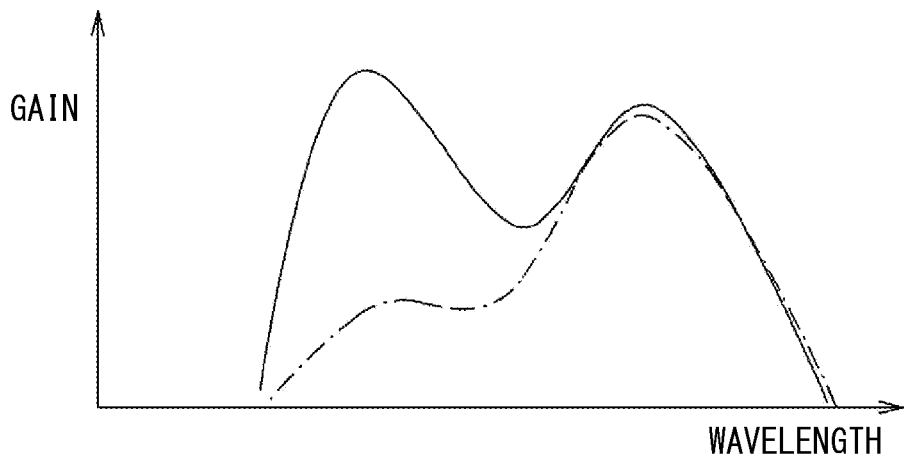
FIG. 14 is a diagram showing a gain spectrum in a low current region according to the first embodiment.

According to the experiment conducted by the inventors of the present disclosure, it was found that the gain in a low current region was improved in the present embodiment, as shown in FIG. 14. In FIG. 14, a solid line shows the gain spectrum of the present embodiment, and an alternate long and short dash line shows the gain spectrum when two quantum dot layers both having the high p-type impurity concentration but having different emission wavelengths are used. As shown in FIG. 14, in the present embodiment, by reducing the p-type impurity concentration of the quantum dot layer 243 having the longer emission wavelength, the emission balance is improved and the gain on the short wavelength side is improved.

In the present embodiment, as described above, the active layer 24 has the plurality of quantum dot layers, and at least a part of the quantum dot layers among the plurality of quantum dot layers is doped with the p-type impurity. Further, at least two quantum dot layers among the plurality of quantum dot layers have different emission wavelengths and different p-type impurity concentrations. In such a configuration, the fluctuations in output due to the temperature change can be suppressed.

According to the embodiment described above, it is possible to achieve the following advantageous effects.

(1) One of the two quantum dot layers has a higher p-type impurity concentration and a shorter emission wavelength than the other. Therefore, the gain in the low current region is improved, and the output fluctuation due to the temperature change can be further reduced.

(2) Among the plurality of quantum dot layers, the quantum dot layer having the highest p-type impurity concentration has a shorter emission wavelength than the other quantum dot layers. Therefore, the gain in the low current region is improved, and the output fluctuation due to the temperature change can be further reduced.

(3) The quantum dot layer having the lowest p-type impurity concentration, among the plurality of quantum dot layers, has a longer emission wavelength than the other quantum dot layers. Therefore, the gain in the low current region is improved, and the output fluctuation due to the temperature change can be further reduced.

(4) The interval between two adjacent emission wavelengths, among the emission wavelengths of the plurality of quantum dot layers, is equal to or less than the distance that is obtained by multiplying the change width of the environmental temperature by the temperature coefficient of the quantum dot layers corresponding to the two emission wavelengths. Therefore, it is possible to suppress a gain drop at a wavelength between the two emission wavelengths.

(5) The interval between two adjacent emission wavelengths, among the emission wavelengths of the plurality of quantum dot layers, is less than the half width of the gain spectrum of the quantum dot layer corresponding to the two emission wavelengths. Therefore, it is possible to suppress a gain drop at a wavelength between the two emission wavelengths.

(6) The plurality of quantum dot layers includes two or more quantum dot layers doped with the p-type impurity at the same concentration, and the two or more quantum dot layers are arranged next to each other, that is, arranged as a unit, in the stack of the plurality of quantum dot layers. Therefore, the production of the active layer 24 is facilitated.

(7) The p-type impurity includes any of beryllium, carbon, and magnesium. By using the p-type impurity having a small diffusion coefficient, it is possible to allow diffusion of the p-type impurity to a desired quantum dot layer while suppressing the diffusion of the p-type impurity to other quantum dot layers.

(8) The operating wavelength $\lambda$op is a wavelength between the wavelength $\lambda$p and the wavelength $\lambda$u at a predetermined temperature. Therefore, the operating wavelength $\lambda$op is generally located between the wavelength $\lambda$p and the wavelength $\lambda$u, and the gain fluctuation due to the temperature change can be further suppressed.

Second Embodiment

A second embodiment will be described. In the present embodiment, the arrangement of the quantum dot layers 242 and 243 is different from that of the first embodiment. The other parts of the present embodiment are the same as those of the first embodiment, and thus only the parts different from the first embodiment will be described hereinafter.

Figure 15:
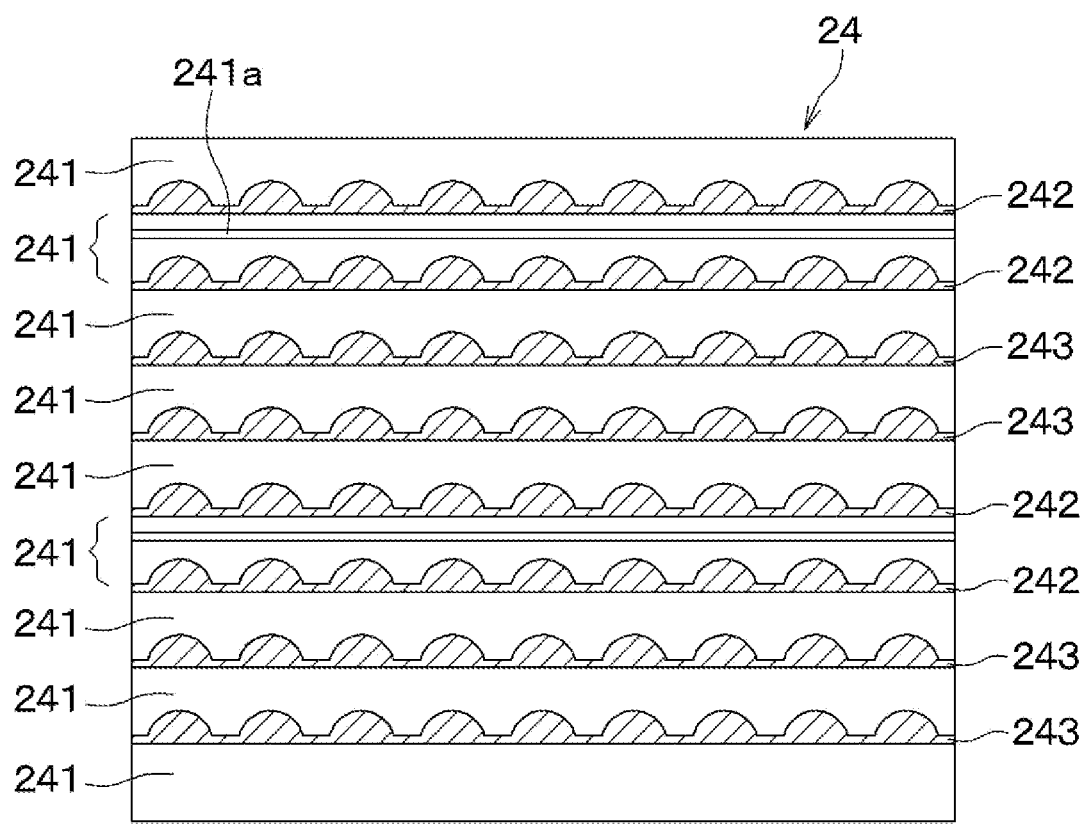
FIG. 15 is a cross-sectional view of an active layer according to a second embodiment.

As shown in FIG. 15, in the present embodiment, the four quantum dot layers 242 are divided and arranged into two or more units. Likewise, the four quantum dot layers 243 are divided and arranged into two or more units. Specifically, the quantum dot layers 242 are divided into plural units each of which includes two quantum dot layers 242. Likewise, the quantum dot layers 243 are divided into plural units each of which includes two quantum dot layers 243. Further, the two quantum dot layers 242 and the two quantum dot layers 243 are alternately arranged. The p-type impurity layer 241a is arranged between the adjacent two quantum dot layers 242. As a result, the p-type impurities are diffused into the quantum dot layers 242 located on both sides of the p-type impurity layer 241a. Also in the present embodiment in which the active layer 24 has such a configuration, the same gain spectrum as in the first embodiment can be obtained.

In the present embodiment, it is possible to attain the advantageous effects as similar to the effects in the first embodiment with the configuration and operation identical to the ones in the first embodiment.

According to the present embodiment described above, it is possible to attain the following effects.

(1) The plurality of quantum dot layers includes two or more quantum dot layers 242 doped with the p-type impurity at the same concentration. In the stack of the plurality of quantum dot layers, the two or more quantum dot layers 242 are arranged as being divided into two or more units, each unit including at least two quantum dot layers 242. The p-type impurity layer 241a is arranged between the two quantum dot layers 242. Therefore, it is possible to suppress the diffusion of p-type impurities into the quantum dot layer 243.

Third Embodiment

A third embodiment will be described. In the present embodiment, the number of the quantum dot layers is different from that of the first embodiment. The other parts of the present embodiment are the same as those of the first embodiment. Therefore, only the parts different from the first embodiment will be described hereinafter.

Figure 16:
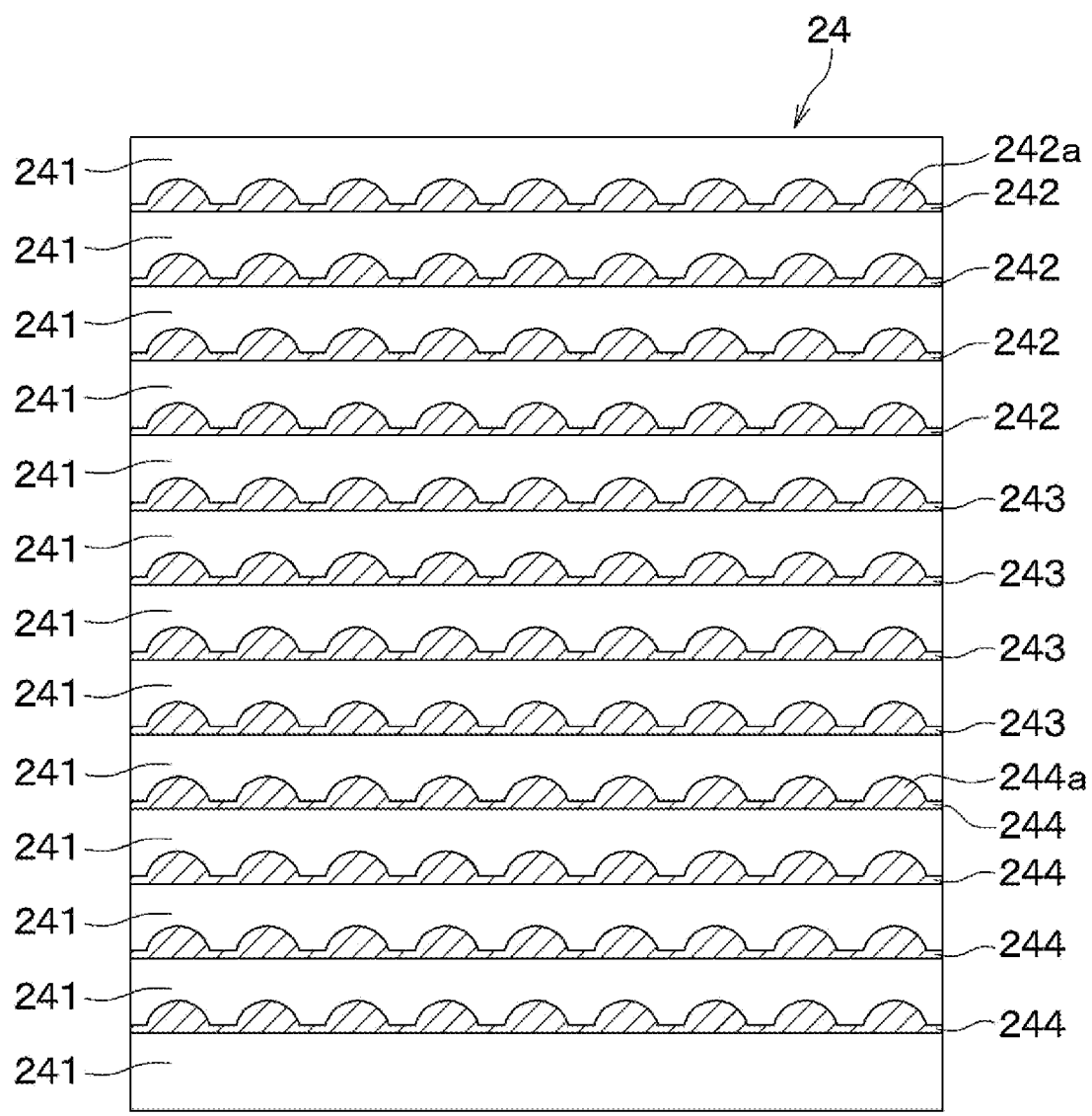
FIG. 16 is a cross-sectional view of an active layer according to a third embodiment.

As shown in FIG. 16, the active layer 24 of the present embodiment includes three types of quantum dot layers. Specifically, the active layer 24 includes a quantum dot layer 244 in addition to the quantum dot layers 242 and 243. In FIG. 16, the p-type impurity layer 241a is not shown.

The quantum dot layers 242 to 244 have different emission wavelengths and different p-type impurity concentrations. Among the quantum dot layers 242 to 244, the quantum dot layer 242 has the shortest emission wavelength, and the quantum dot layer 244 has the longest emission wavelength. That is, in the present embodiment, the emission wavelength of the quantum dot layer 242 is the wavelength $\lambda$p, and the emission wavelength of the quantum dot layer 244 is the wavelength $\lambda$u. The operating wavelength $\lambda$op is an emission wavelength between the emission wavelength of the quantum dot layer 242 and the emission wavelength of the quantum dot layer 244 at the predetermined temperature.

The intervals between the quantum dot layers 242 to 244 are set in the same manner as in the first embodiment. That is, the interval between the peak wavelength of the quantum dot layer 242 and the peal wavelength of the quantum dot layer 243 is set to be equal to or less than the distance that is obtained by multiplying the variation width of the environmental temperature by the temperature coefficient of the quantum dot layer 242 or the quantum dot layer 243. Further, this interval is equal to or less than the half width of the gain spectra of the quantum dot layers 242 and 243. The interval between the peak wavelength of the quantum dot layer 243 and the peak wavelength of the quantum dot layer 244 is set to be equal to or less than the distance that is obtained by multiplying the variation width of the environmental temperature by the temperature coefficient of the quantum dot layer 243 or the quantum dot layer 244. Further, this interval is equal to or less than the half width of the gain spectra of the quantum dot layers 243 and 244.

Among the quantum dot layers 242 to 244, the quantum dot layer 242 has the highest p-type impurity concentration, and the quantum dot layer 244 has the lowest p-type impurity concentration. Specifically, the quantum dot layers 242 and 243 are doped with the p-type impurity, and the p-type impurity concentration of the quantum dot layer 242 is higher than the p-type impurity concentration of the quantum dot layer 243. The quantum dot layer 244 is an undoped layer containing almost no p-type impurities. The p-type impurity concentration of the quantum dot layer 242 is twice or more the surface density of the quantum dots 242a, and the p-type impurity concentration of the quantum dot layer 244 is less than twice the surface density of the quantum dots 244a.

Figure 17:
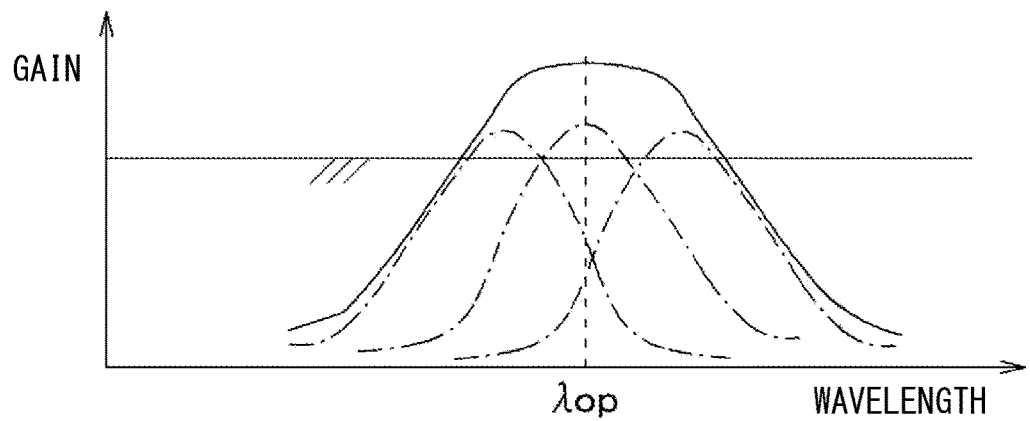
FIG. 17 is a diagram showing a gain spectrum of the active layer according to the third embodiment.
Figure 18:
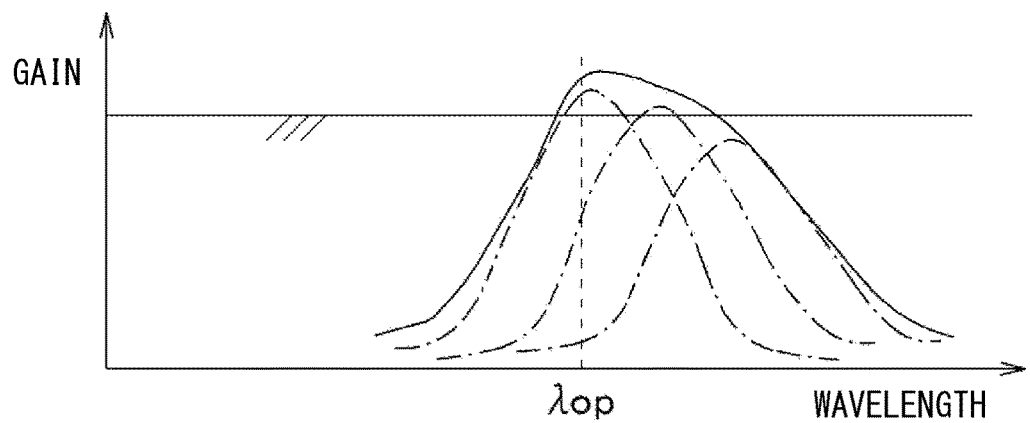
FIG. 18 is a diagram showing a gain spectrum at a high temperature according to the third embodiment.
Figure 19:
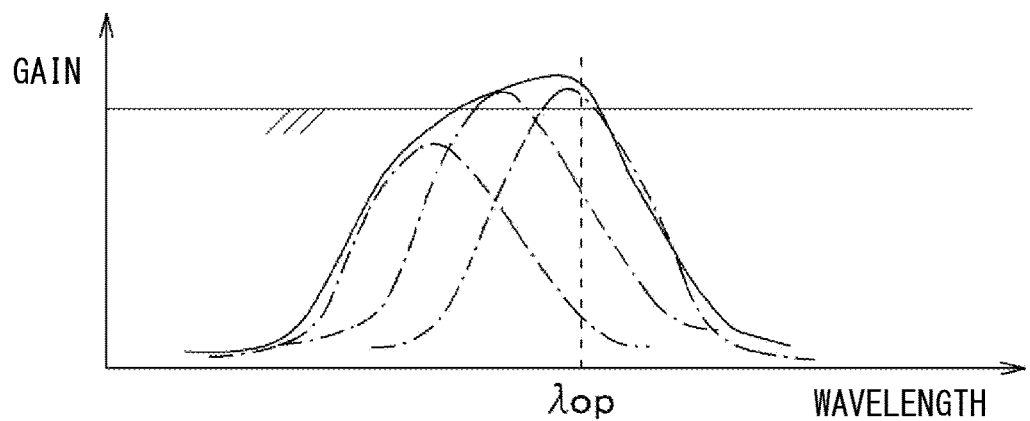
FIG. 19 is a diagram showing a gain spectrum at a low temperature according to the third embodiment.

The effects of the present embodiment will be described with reference to FIGS. 17 to 19. In FIGS. 17 to 19, the solid line shows the gain spectrum of the active layer 24, and the three alternate long and short dash lines show the gain spectra of the quantum dot layers 242 to 244, in which the left one is the gain spectrum of the quantum dot layer 242, the right one is the gain spectrum of the quantum dot layer 244, and the middle one is the gain spectrum of the quantum dot layer 243.

As shown in FIG. 17, it is assumed that the operating wavelength λop is fixed to the peak wavelength of the quantum dot layer 243 at the room temperature. In this case, when the temperature is high, for example, at 85° C., as shown in FIG. 18, the three gain spectra shift to the long wavelength side, and the gains of the quantum dot layers 243 and 244 decrease. However, since the gain of the quantum dot layer 242 on the short wavelength side is maintained at a large value, the gain at the operating wavelength λop is maintained and the output is maintained. Since the quantum dot layer 243 has the p-type impurity concentration higher than the quantum dot layer 244, the decrease of the gain of the quantum dot layer 243 is smaller than the decrease of the gain of the quantum dot layer 244. As a result, at the high temperature, the gain of the active layer 24 is maintained at the wavelength between the peak wavelength of the quantum dot layer 242 and the peak wavelength of the quantum dot layer 243.

When the temperature is low, for example, at −40° C., as shown in FIG. 19, the three gain spectra shift to the short wavelength side, and the gains of the quantum dot layers 242 and 243 decrease. However, since the gain of the quantum dot layer 244 on the long wavelength side is maintained at a large value, the gain at the operating wavelength λop is maintained and the output is maintained. Since the quantum dot layer 243 has the p-type impurity concentration lower than the quantum dot layer 242, the decrease of the gain of the quantum dot layer 243 is smaller than the decrease of the gain of the quantum dot layer 242. As a result, at the low temperature, the gain of the active layer 24 is maintained at a wavelength between the peak wavelength of the quantum dot layer 243 and the peak wavelength of the quantum dot layer 244.

In the present embodiment, it is possible to attain the advantageous effects as similar to the effects in the first embodiment with the configuration and operation identical to the ones in the first embodiment.

According to the embodiment described above, it is possible to attain the following effects.

(1) In the plurality of quantum dot layers, the higher the p-type impurity concentration is, the shorter the emission wavelength is. Therefore, the band of the gain spectrum of the active layer 24 is widened when the temperature is low and high, and the output fluctuation due to the temperature change can be further suppressed.

(2) The active layer 24 includes three types of quantum dot layers 242, 243, 244 having different emission wavelengths. As a result, the gain spectrum of the active layer 24 is wider than that of the first embodiment, and the gain fluctuation can be further suppressed.

Fourth Embodiment

A fourth embodiment will be described. In the present embodiment, the number of the quantum dot layers is different from that of the third embodiment. The other prats of the present embodiment are the same as those of the third embodiment. Therefore, only the parts different from the third embodiment will be described hereinafter.

Figure 20:
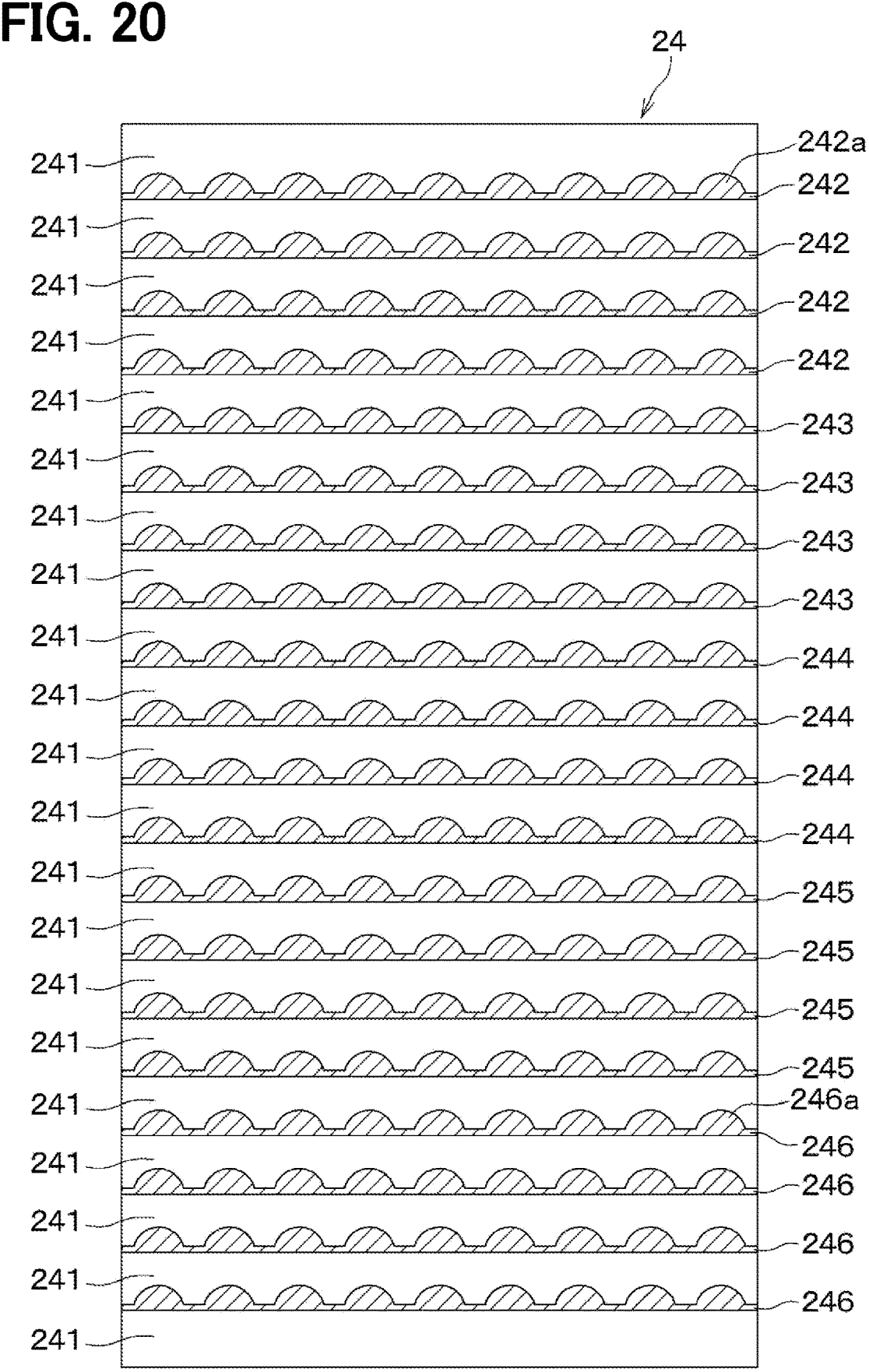
FIG. 20 is a cross-sectional view of an active layer according to a fourth embodiment.

As shown in FIG. 20, the active layer 24 of the present embodiment includes five types of quantum dot layers. Specifically, the active layer 24 includes quantum dot layers 245 and 246 in addition to the quantum dot layers 242 to 244. In FIG. 20, the p-type impurity layer 241a is not shown.

The quantum dot layers 242 to 246 have different emission wavelengths and different p-type impurity concentrations. Among the quantum dot layers 242 to 246, the emission wavelengths increase from the quantum dot layer 242 to the quantum dot layer 246 in this order. Namely, the quantum dot layer 242 has the shortest emission wavelength, and the quantum dot layer 246 has the longest emission wavelength. That is, in the present embodiment, the emission wavelength of the quantum dot layer 242 is the wavelength λp and the emission wavelength of the quantum dot layer 246 is the wavelength λu. The operating wavelength λop is the wavelength between the emission wavelength of the quantum dot layer 242 and the emission wavelength of the quantum dot layer 246 at a predetermined temperature. The wavelength intervals between the quantum dot layers 242 to 246 are set in the same manner as in the first and third embodiments.

Among the quantum dot layers 242 to 246, the p-type impurity concentration lowers from the quantum dot layer 242 to the quantum dot layer 246 in this order. Namely, the quantum dot layer 242 has the highest p-type impurity concentration and the quantum dot layer 246 has the lowest p-type impurity concentration. Specifically, the quantum dot layer 242 to 245 are doped with the p-type impurity, and the quantum dot layer 246 is an undoped layer containing almost no p-type impurities. The p-type impurity concentration of the quantum dot layer 242 is twice or more the surface density of the quantum dot 242a, and the p-type impurity concentration of the quantum dot layer 246 is less than twice the surface density of the quantum dot 246a.

Figure 21:
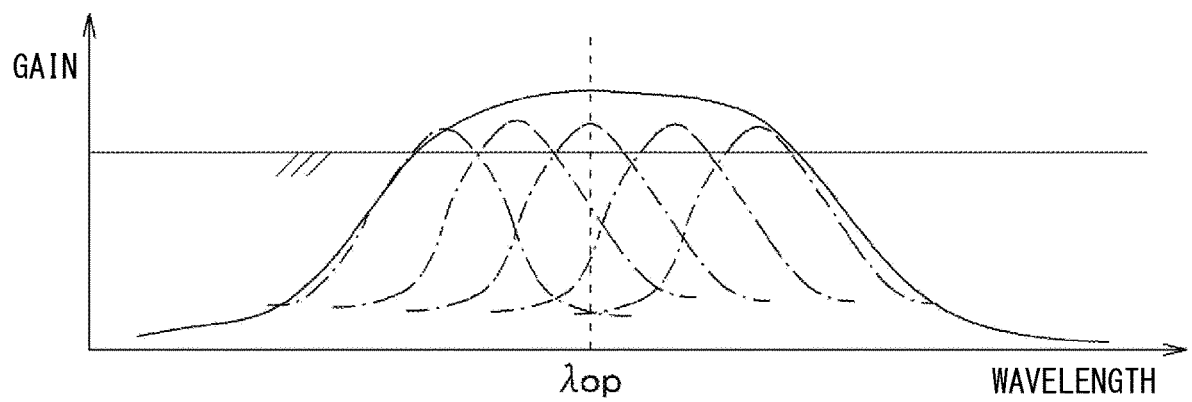
FIG. 21 is a diagram showing a gain spectrum of the active layer according to the fourth embodiment.
Figure 22:
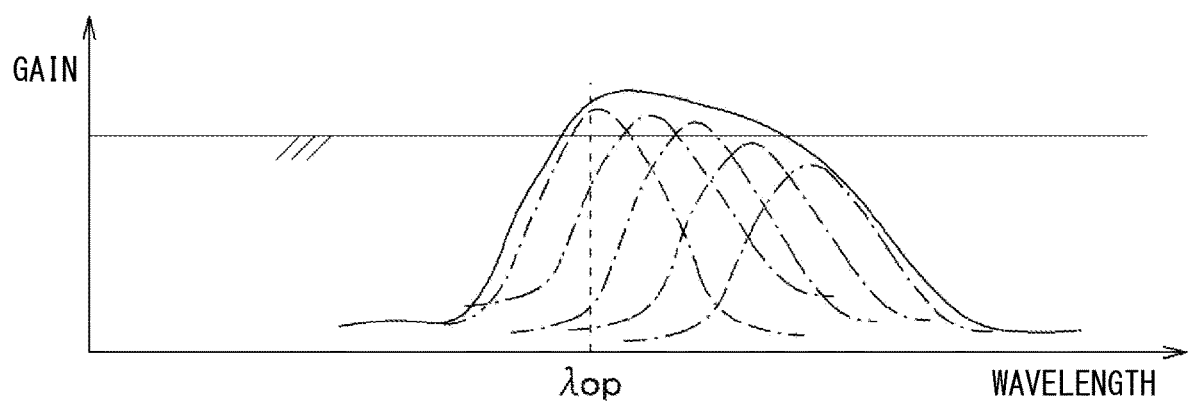
FIG. 22 is a diagram showing a gain spectrum at a high temperature according to the fourth embodiment.
Figure 23:
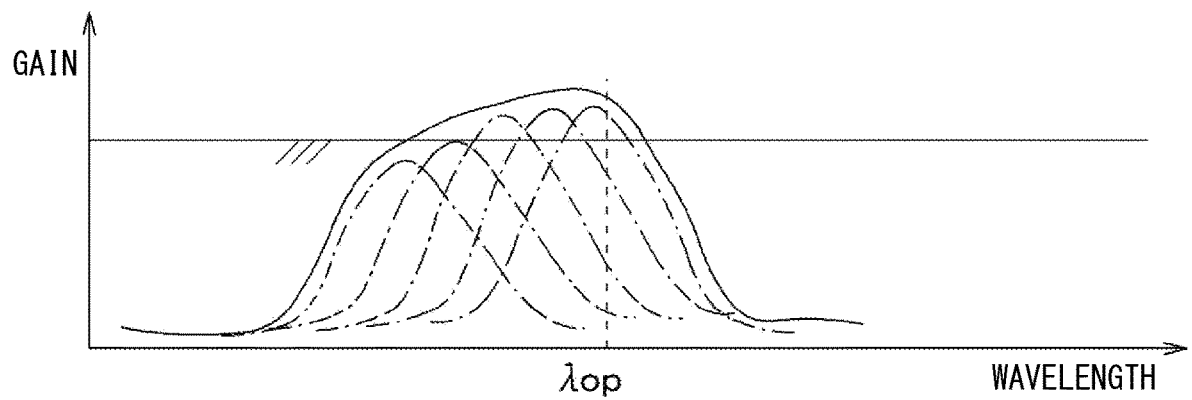
FIG. 23 is a diagram showing a gain spectrum at a low temperature according to the fourth embodiment.

The effects of the present embodiment will be described with reference to FIGS. 21 to 23. In FIGS. 21 to 23, the solid line shows the gain spectrum of the active layer 24, and the five alternate long and short dash lines show the gain spectra of the quantum dot layers 242 to 246 in order from the left, in which the leftmost one is the gain spectrum of the quantum dot layer 242 and the rightmost one is the gain spectrum of the quantum dot layer 246.

As shown in FIG. 21, it is assumed that the operating wavelength λop is fixed to the peak wavelength of the quantum dot layer 244 when the temperature is the room temperature. In this case, when the temperature is high, for example, at 85° C., as shown in FIG. 22, the five gain spectra are shifted to the long wavelength side, and the gain decrease is large in the order of the quantum dot layers 246 to 243. Namely, the magnitude of gain decrease is larger in the quantum dot layer 246 than in the quantum dot layer 242. However, since the gain of the quantum dot layer 242 on the short wavelength side is maintained at a large value, the gain at the operating wavelength λop is maintained and the output is maintained. Since the quantum dot layers 243 and 244 have the p-type impurity concentrations higher than those of the quantum dot layers 245 and 246, the decrease of the gain of the quantum dot layers 243 and 244 is smaller than the decrease of the gain of the quantum dot layers 245 and 246. As a result, at the high temperature, the gain of the active layer 24 is maintained at a wavelength between the peak wavelength of the quantum dot layer 242 and the peak wavelength of the quantum dot layer 244.

When the temperature is low, for example, at −40° C., as shown in FIG. 23, the five gain spectra are shifted to the short wavelength side, and the gain decrease is large in the order of the quantum dot layers 242 to 245. Namely, the magnitude of gain decrease is larger in the quantum dot layer 242 than in the quantum dot layer 245. However, since the gain of the quantum dot layer 246 on the long wavelength side is maintained at a large value, the gain at the operating wavelength λop is maintained and the output is maintained. Since the quantum dot layers 244 and 245 have the p-type impurity concentrations lower than those of the quantum dot layers 242 and 243, the decrease of the gain of the quantum dot layers 244 and 245 is smaller than the decrease of the gain of the quantum dot layers 242 and 243. As a result, at the low temperature, the gain is maintained at a wavelength between the peak wavelength of the quantum dot layer 244 and the peak wavelength of the quantum dot layer 246.

In the present embodiment, it is possible to attain the advantageous effects as similar to the effects in the first and third embodiments with the configuration and operation identical to the ones in the first and third embodiments.

According to the embodiment described above, it is possible to attain the following effects.

(1) The active layer 24 includes five types of quantum dot layers 242 to 246 having different emission wavelengths. As a result, the gain spectrum of the active layer 24 can be widened as compared with the third embodiment, and the gain fluctuation can be further suppressed.

OTHER EMBODIMENTS

The present disclosure is not limited to the embodiments described above, and can be appropriately modified within the scope described in the claims. The embodiments described above are not independent of each other, and can be appropriately combined except when the combination is obviously impossible. In each of the embodiments described above, individual elements or features of a particular embodiment are not necessarily essential unless it is specifically stated that the elements or the features are essential, or unless the elements or the features are obviously essential in principle. Further, in each of the embodiments described above, when numerical values such as the number, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number.

For example, in the third embodiment, the quantum dot layers 242 to 244 may be arranged by being divided into two or more units, like the quantum dot layers 242 to 243 of the second embodiment. Further, in the fourth embodiment, the quantum dot layers 242 to 246 may be arranged by being divided into two or more units, like the quantum dot layers 242 to 243 of the second embodiment.

Further, in the first and second embodiments, the p-type impurity layer 241*a* may be arranged between the quantum dot layer 242 and the quantum dot layer 243. In this case, it is preferable to arrange the p-type impurity layer 241*a* at a position closer to the quantum dot layer 242 than to the quantum dot layer 243.

Further, the number of the quantum dot layers 242 to 246 may be, respectively, three or less, or five or more.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. An optical semiconductor device comprising:
an active layer including a plurality of quantum dot layers,
wherein the plurality of quantum dot layers includes at least one quantum dot layer doped with a p-type impurity, and
wherein the plurality of quantum dot layers includes at least two quantum dot layers having different emission wavelengths and different p-type impurity concentrations from each other,
wherein the at least two quantum dot layers having the different emission wavelengths and different p-type impurity concentrations from each other includes:
at least two first quantum dot layers having a first emission wavelength shorter than a predetermined emission wavelength, doped with the p-type impurity, and disposed adjacent to each other, the predetermined emission wavelength corresponding to an operating wavelength of the active layer at a predetermined temperature; and
at least two second quantum dot layers having a second emission wavelength longer than the predetermined emission wavelength, and undoped,
wherein
the active layer further includes a p-type impurity layer disposed between the at least two first quantum dot layers adjacent to each other, and
the at least two second quantum dot layers are disposed adjacent to each other without interposing a p-type impurity layer therebetween.

2. The optical semiconductor device according to claim 1, wherein, among the plurality of quantum dot layers, a quantum dot layer having a highest p-type impurity concentration has a shorter emission wavelength than another one of the plurality of quantum dot layers.

3. The optical semiconductor device according to claim 1, wherein, among the plurality of quantum dot layers, a quantum dot layer having a lowest p-type impurity concentration has a longer emission wavelength than another one of the plurality of quantum dot layers.

4. The optical semiconductor device according to claim 1, wherein, among the plurality of quantum dot layers, a quantum dot layer having a higher p-type impurity concentration than the other has a lower emission wavelength than the other.

5. The optical semiconductor device according to claim 1, wherein
the first emission wavelength and the second emission wavelength are adjacent to each other among emission wavelengths of the plurality of quantum dot layers; and an interval between the first emission wavelength and the second emission wavelength is equal to or less than a distance that is obtained by multiplying a variation width of an environmental temperature by a temperature coefficient of the first quantum dot layer or a temperature coefficient of the second quantum dot layer.

6. The optical semiconductor device according to claim 5, wherein
the temperature coefficient of each quantum dot layer is ($\lambda 2-\lambda 1$)/(T2−T1),
T1 is a first environmental temperature,
T2 is a second environmental temperature,
$\lambda 1$ is a wavelength at which the quantum dot layer has a peak gain at temperature T1, and
$\lambda 2$ is a wavelength at which the quantum dot layer has a peak gain at temperature T2.

7. The optical semiconductor device according to claim 1, wherein
the first emission wavelength and the second emission wavelength are adjacent to each other among emission wavelengths of the plurality of quantum dot layers; and
an interval between the first emission wavelength and the second emission wavelength is equal to or less than a half width of a gain spectrum of the first quantum dot layer or a half width of a gain spectrum of the second quantum dot layer.

8. The optical semiconductor device according to claim 1,
wherein the plurality of quantum dot layers includes at least two quantum dot layers doped with the p-type impurity at a same concentration, and
wherein, in a stack of the plurality of quantum dot layers, the at least two quantum dot layers doped with the p-type impurity at the same concentration are arranged adjacent to each other as a unit.

9. The optical semiconductor device according to claim 1,
wherein the plurality of quantum dot layers includes at least two quantum dot layers doped with the p-type impurity at a same concentration, and
wherein in a stack of the plurality of quantum dot layers, the at least two quantum dot layers doped with the p-type impurity at the same concentration are arranged by being divided into at least two units.

10. The optical semiconductor device according to claim 1,
wherein the p-type impurity concentration of a quantum dot layer having a highest p-type impurity concentration among the plurality of quantum dot layers is twice or more a surface density of quantum dots.

11. The optical semiconductor device according to claim 1,
wherein the p-type impurity concentration of a quantum dot layer having a lowest p-type impurity concentration among the plurality of quantum dot layers is less than twice a surface density of quantum dots.

12. The optical semiconductor device according to claim 1,
wherein the p-type impurity includes any of beryllium, carbon and magnesium.

13. A semiconductor laser device comprising:
the optical semiconductor device according to claim 1; and
a wavelength selector configured to select the operating wavelength of the active layer.

14. The semiconductor laser device according to claim 13, wherein
the operating wavelength of the active layer is set to a wavelength between a shortest emission wavelength and a longest emission wavelength among emission wavelengths of the plurality of quantum dot layers at a room temperature.

15. The semiconductor laser device according to claim 13, wherein
the operating wavelength is set to a wavelength between a shortest emission wavelength and a longest emission wavelength among emission wavelengths of the plurality of quantum dot layers at a central temperature of environmental temperatures.

16. The optical semiconductor device according to claim 1,
the interval between the first emission wavelength and the second emission wavelength is less than a half width of a gain spectrum of the first quantum dot layer or a half width of a gain spectrum of the second quantum dot layer.

17. The optical semiconductor device according to claim 1, wherein
among the plurality of quantum dot layers, a p-type impurity concentration is increased as an emission wavelength is reduced.

18. The optical semiconductor device according to claim 1,
wherein, among the plurality of quantum dot layers, a quantum dot layer having a highest p-type impurity concentration has a shortest emission wavelength, and
a quantum dot layer having a lowest p-type impurity concentration has a longest emission wavelength.

19. The optical semiconductor device according to claim 1, wherein
the p-type impurity layer is disposed only between the at least two first quantum dot layers.

20. The optical semiconductor device according to claim 1, wherein
the predetermined temperature is a central temperature of an environmental temperature range of the active region when in use, and
the environmental temperature range is from −40 degrees Celsius to 85 degrees Celsius.

* * * * *